United States Patent Office 3,004,958
Patented Oct. 17, 1961

3,004,958
NOVEL POLYMERIC MONOMERS AND POLYMERS THEREOF
Alan Robert Berens, Hudson, Ohio, assignor to The B. F. Goodrich Company, New York, N.Y., a corporation of New York
No Drawing. Filed Jan. 7, 1957, Ser. No. 632,629
4 Claims. (Cl. 260—86.3)

The present invention relates generally to the preparation of novel polymeric monomeric materials and polymers thereof. More particularly the present invention relates to novel monomeric materials derived from polyoxyalkylene glycol compounds and to homopolymers and copolymers thereof, and especially to the monoacrylate esters and maleate esters of high molecular weight monohydric (chain terminated) polyoxyalkylene glycol type compounds.

In the past, repeated attempts have been made to prepare vinyl copolymer resins, particularly those of vinyl chloride and vinylidene chloride, which are flexible by virtue of "internal plasticization" introduced by means of plasticizing comonomers rather than by virtue of added "external" type plasticizers such as the oily ester type plasticizers, rubbers and resins conventionally added to vinyl resins. In a few instances "internally" plasticized resins of improved flexibility have been developed. In most cases, however, improved flexibility is obtained at the sacrifice of one or more of the important properties of strength, durability, electrical properties and stability to the effects of light and heat. The most serious defect, however, has been the narrow range of temperatures in which these internally-plasticized copolymers retain their strength, flexibility and other useful properties. Many "internally plasticized" resins not only soften and become sticky at quite moderate temperatures but stiffen at temperatures only a few degrees below room temperature. They have, therefore, a "useful-temperature range" of the order of 20 to 30° C. Ester-plasticized polyvinyl chloride, on the other hand, has a range of this type of about 80° C. No general purpose "internally-plasticized" vinyl resin has been developed that duplicates the useful range of externally-plasticized polyvinyl chloride.

It is among the objects of this invention, therefore, to provide new polymerizable substances, themselves polymeric in form, which are useful in the production of new and novel polymeric materials; to provide new and novel polymeric material having a structure closely resembling corresponding "graft" copolymers; to provide, specifically, new and novel copolymers of vinyl chloride, vinylidene chloride, vinylidene cyanide, acrylonitrile and others which are useful over a wider range of temperature; and to provide new and novel polymerizable polymeric derivatives of monofunctional polyoxyalkylene glycol type compounds. Other objects and advantages will be apparent, or will become apparent, in the more detailed description of the invention to follow.

In accordance with the present invention it has been found that materials which contain (1) not more than one polymerizable mono-unsaturated acid residue per molecule and (2) at least one relatively long polyoxyalkylene(polyether) chain per molecule form a novel class of monomeric, polymerizable materials. These monomeric materials in themselves are polymeric in nature and hence the products resulting from their polymerization have a structure closely resembling a corresponding "graft" polymer. Both the homopolymers and the many and varied copolymers of the materials of the above class are highly novel and useful. Some of the homopolymers are useful as hydrophilic, highly swollen thickeners, extenders, suspending agents, etc. in aqueous media. When copolymerized with another monomeric material, especially the highly polar monomers which form hard, rigid and more or less crystalline homopolymers such as polyvinyl chloride or polyvinylidene chloride, these polyether type monomers impart a unique type of "internal plasticization" to the copolymer. The copolymers, for example with vinyl chloride, are flexible, strong and useful over a range of temperatures as wide or wider than that of ordinary plasticized polyvinyl chloride.

The above-described class of polymeric polyether monomers can be defined as derivatives of a monohydric (chain-terminated) polyoxyalkylene glycol, although it is to be understood that some of the monomers of this class can be made without having passed through the monohydric polyglycol intermediate stage. The terms "monohydric polyoxyalkylene glycol" and "chain-terminated polyoxyalkylene glycol" refer to compounds having the general structure

$$T-(A-O-)_n-H$$

wherein T is a terminal grouping inert or inactive during esterification and polymerization, A is a divalent alkylene group containing at least two consecutively connected carbon atoms between ether oxygen atoms and $n$ is an average number equal to at least 4. In the above formula the (T) group can be an alkoxy group, an ester group, a phenoxy group, a halogen atom, a halomethylene (—$CH_2Cl$) group, a —$CHCl_2$ group, a —$CCl_3$ group, and the like.

The chain-terminated polyoxyalkylene glycol can be produced, as such, by condensing an alkylene oxide such as ethylene oxide with a chain terminator such as a monohydric alcohol to produce an alkoxypolyoxyethylene glycol; with a monohydric phenol to produce a phenoxypolyoxyethylene glycol; or with any other organic compound containing an active hydrogen which will form an inert terminal group of the class described. Materials of this type can be made employing other alkylene oxides such as the 1,2- and 1,3-propylene oxides, 1,2-butylene oxide, tetramethylene oxide (1,4-butylene oxide), styrene oxide and others, as well as an epihalohydrin type compound, or mixtures of two or more of these and other like compounds.

As pointed out above, the polyether-ester monomers of this invention contain not more than a single mono-unsaturated acid residue attached to each polyether chain. It is essential that the monomer be free of material containing more than one unsaturated grouping per molecule. The presence of only a few percent (1 to 2%) of molecules containing 2 or more unsaturated groupings leads to the formation of cross-linked, insoluble polymeric products. It goes without saying, therefore, that the monomers of this invention ordinarily cannot be made by partial esterification of dihydric or polyhydric polyoxyalkylene glycols. The latter procedure always leads to at least a small proportion of molecules containing 2 or more unsaturated groupings.

The unsaturated acid residue attached to each molecule of the above-described compounds can be derived from any polymerizable mono-unsaturated carboxylic acid or acid halide including an acrylic acid such as acrylic acid itself, acrylyl chloride, methacrylic acid, alpha-phenyl acrylic acid, beta-phenyl acrylic acid, isocrotonic acid, itaconic acid, maleic anhydride, fumaric acid, and many others. Such acid groupings can be introduced by esterifying one of the chain-terminated polyoxyalkylene glycols described above with an acid, acid chloride, or acid anhydride. Conversely, esters of this same type can be prepared directly by condensing the unsaturated acid or its acid chloride with an alkylene monooxide and, if desired, subsequently treating the resulting ester with another (saturated) acid to react with the remaining hydroxyl groups. Such materials have the structures:

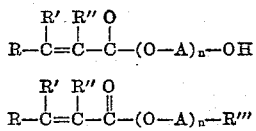

wherein R is hydrogen or a hydrocarbon group and R', R" and R'" are hydrogen, hydrocarbon, alkoxy, ester, keto, cyano or other inert (saturated) substituent groups and $n$ is as defined above (at least 4). Similarly, when a dicarboxylic acid anhydride such as maleic anhydride is utilized the esters have the structure:

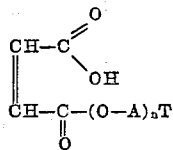

where A, T and $n$ are as defined above. Maleic anhydride is somewhat unique in that esterification of its two carboxyl groups proceeds in two controllable stages, the second or diester stage requiring increased temperatures and esterification catalysts to occur to any extent.

A preferred class of monomeric ester-polyether type compounds are produced when a cyclic alkylene monooxide such as tetrahydrofurane is condensed or polymerized with a mono-unsaturated acid halide in the presence of a Friedel-Crafts type catalyst such as $AlCl_3$, $BF_3$, $BF_3$/etherate, etc. When this occurs chain-terminated ester-polyether compounds are produced directly. In this reaction an oxonium salt is formed and upon addition of the acid chloride or halide the cyclic monooxide ring opens and the ring fragments polymerize and react simultaneously to produce polymeric compounds having long polyether chains terminated on one end by an unsaturated acid ester group and on the other by a halogen atom. Such compounds have the structure

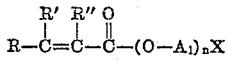

wherein R is hydrogen or a hydrocarbon group, R' and R" are hydrogen, hydrocarbon, alkoxy, ester or other inert substituent group, $n$ is as defined above, X is halogen and $A_1$ is a divalent alkylene group having at least 3 consecutively connected carbon atoms (interposed between the ether-oxygen atoms). The reaction product of tetrahydrofurane, acrylyl chloride and $AlCl_3$, for example, has the structure:

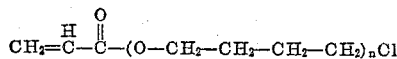

wherein $n$ is an average number of at least 4. In this compound the terminal halogen atom (chlorine) derived from the acid chloride is very firmly bound and serves as a very inert terminal (T) group. The polymerization or condensation reaction in such a process is quite rapid and takes place quite readily at room temperature or below. The molecular weight of the product is subject to control by varying reaction time, temperature, catalyst concentration, and the like.

Monomers of the above type, which have at least three consecutively-connected carbon atoms between each pair of ether oxygens, are greatly preferred because of the enhanced stability of their copolymerization products with other monomers such as vinyl chloride. The tetrahydrofurane-derived ester, which in reality is a 1,4-tetramethylene oxide condensate, is especially valuable because of the greater stability of its copolymers with polar monomers such as vinyl chloride, vinylidene chloride, acrylonitrile and the like.

Of the broad class of polymerizable monoolefinic esters of chain-terminated polyoxylakylene glycols the preferred compounds are the monoacrylate esters. More preferred are the monoacrylate esters of chain-terminated polyoxyalkylene glycols wherein the alkylene group contains at least three consecutively-connected carbon atoms interposed between the ether oxygen atoms. Most preferred are the monoacrylate esters of chloro-terminated polyoxytetramethylene glycols.

As pointed out above, the monohydric polyoxyalkylene glycol type compound should contain an average of at least 4 alkylene oxide groups per molecule. The reason for this is believed to be that it is the length and character of the long polyether type chains which contribute the novel properties to these compounds such as the markedly different plasticization contributed to their copolymers.

For example, even when the monomeric charge consists of as much as 50 to 90% by weight of one of the higher molecular weight esterpolyether monomers of this invention and the remainder of the charge is vinyl chloride, the copolymeric product can be envisioned to consist of a backbone formed of a considerable number of consecutively-connected vinyl chloride units interrupted at widely-spaced intervals by a monoacrylate (unsaturated acid) unit having a long polyether residue dangling therefrom as a side chain. This is likely because the molecular weight of the ester-polyether monomer can be 10 times or more that of vinyl chloride and on a molar basis, therefore, there can be as many or more of vinyl chloride molecules present, as there are of the ester-polyether, to so unite. It may be that the spacing of the monoacrylate polyether groups is so great as to permit the vinyl chloride backbone to contact other chains or to bend back on itself and establish the intramolecular and intermolecular forces (Van der Waals forces, secondary crystallinity forces, or hydrogen bonding forces) which are believed to make polyvinyl chloride such a strong substance. In the case of externally-plasticized forms of polyvinyl chloride (e.g., oily ester plasticized) it has been postulated that the contact between the polymer chains and the amorphous plasticizer is sufficiently imperfect to permit the establishment, at certain points in the polymer chains at least, of these intermolecular or intramolecular forces and that this latter phenomenon is responsible for the excellent physical properties which externally-plasticized forms of polyvinyl chloride are known to exhibit.

The long polyether side chains on, for example, a vinyl having considerable flexibility and reduced tendency towar having considerable flexibility and reduced tendency toward self-crystallization. Comonomeric substances of low molecular weight have side chains of greater rigidity when affixed to a polyvinyl chloride backbone. Comonomeric substances containing long carbon-to-carbon chains, as for example the n-alkyl acrylates higher than octyl, or the vinyl esters of lauric or higher acids, may introduce stiffness by virtue of side-chain crystallization.

Comonomeric substances of lower molecular weight, when combined with vinyl chloride, for example, in a proportion sufficient to impart the desired degree of flexibility, can be envisioned as entering the vinyl chloride backbone at such frequent intervals that the inherent cohesive nature of the latter is destroyed. In contrast, with the same weight proportions, the polyether type monomers of this invention, because of their much higher molecular weight (350, 550, 750, 1250, 2000 or even higher), enter the backbone chain at such widely-separated intervals that the vinyl chloride chain can establish the above-mentioned intermolecular forces (with other molecules) or with itself by bending back or coiling back on itself. Whatever the explanation, however, these surprising internal plasticizing effects are not shown by the derivatives of the lower molecular weight (i.e., $n$ less than 4) chain-terminated polyoxyalkylene glycols to such a marked degree. In the alkoxy-polyoxyethylene glycols, the glycol portion of the molecule should have a molecular weight generally in excess of 207 for a methoxytetraethylene glycol. Likewise, with the preferred chloropolyoxytetramethylene glycol type compounds, the glycol portion of the molecule should have a minimum molecular weight of 339 for a chloro-polyoxytetramethylene glycol having four tetramethylene oxide units. In general, with either type, it is preferred to utilize those having a glycol portion of molecular weight of at least 350.

The monoesters of acrylic acid, for example, derived from a methoxy-polyoxyethylene glycol or a chloropolyoxytetramethylene glycol of average molecular weight 350, 550, 750 or 1250 homopolymerize to form novel hydrophilic homopolymers useful as thickening agents, gums, dispersing agents and the like. Copolymers of these monomers with vinyl chloride are flexible materials of great toughness and high strength yet they are processed quite easily without plasticizers. At room temperature and at even moderately elevated temperatures these materials are not sticky or tacky and have very high strength. Copolymers of these same monoacrylate esters with vinylidene chloride also have novel "internally-plasticized" qualities.

The mono-unsaturated polyether type monomers of this invention are polymerizable in bulk, in solution, in aqueous suspension and in aqueous emulsion systems. The monoacrylate monester type compounds will spontaneously polymerize in bulk on standing for several days at room temperature. Peroxides will increase the speed of bulk polymerization. For efficient polymerization in solution or in aqueous systems a catalyst is usually required. Peroxide-type catalysts are effective, oil- or solvent-soluble peroxides such as benzoyl peroxide, o,o'-dichlorobenzoyl peroxide, and others being effective when the monovinyl compound is polymerized in bulk, in solution in an organic solvent such as hexane, cyclohexane, benzene, toluene, xylene and others or in aqueous suspension. Water-soluble peroxides such as the sodium, potassium, lithium and ammonium persulfates, and others are especially effective in aqueous suspension and emulsion systems. Due to the highly hydrophilic character of some of these compounds, an emulsifier or dispersing agent is not ordinarily required in aqueous suspension systems, although for the production of stable latex-like dispersions a small amount of any of the emulsifiers and dispersing agents conventionally employed in polymerization may be utilized.

In copolymerization, the polyether type monomers of this invention may be combined with a wide variety of other monomeric materials and in a wide range of proportions. At least 5 percent polyether type monomers by weight of the total monomer charge is usually required to produce a noticeable effect on the properties of the copolymeric products. Copolymers may be made from mixtures containing as much as 99 percent by weight or more of the polymeric monomers of this invention. The polymeric monomers of this invention may be copolymerized with any ethylenically-unsaturated monomer including especially the monomeric vinylidene type compounds, that is, monomers containing at least one vinylidene $CH_2=C<$ group including the vinyl-type compounds (vinyl compounds contain the characteristic

group wherein hydrogen is attached to one of the free valences of the vinylidene group, and, therefore, are a sub-genus of vinylidene compounds according to this definition) such as vinyl chloride, vinylidene chloride, vinylidene cyanide (1,1-dicyanoethylene), the vinyl esters of the fatty acids such as vinyl acetate and vinyl chloroacetate, the acrylic acids (as defined above), their esters, amides and nitriles including acrylic acid itself, methacrylic acid, the alkyl esters of the acrylic acids, acrylonitrile, acrylamide and others, hydrocarbons such as ethylene, propylene, isobutylene, styrene and cyclohexene, maleic anhydride and its esters, fumaric acid and its esters, and many others.

As comonomeric substances there may also be employed polyolefinic materials containing at least one vinylidene group such as the butadiene-1,3 hydrocarbons including butadiene, isoprene, piperylene and other conjugated dienes as well as other conjugated and non-conjugated polyolefinic monomers including divinyl benzene, polyallyl sucrose, the diacrylate type esters of ethylene and polyethylene glycols, and many others.

Greatly preferred monomers are the monoolefinic polar monomers such as vinyl chloride, vinylidene chloride, acrylonitrile, and vinylidene cyanide (1,1-dicyanoethylene). Such monomers homopolymerize with the formation of hard, rigid and more or less crystalline homopolymers which are difficult to process (without plasticizer) at temperatures appreciably below their decomposition points. Copolymers of one or more of these polar monomers with the ester-polyoxyalkylene glycol type monomers are easily processed (without plasticizer) at temperatures normal to the plasticized forms of the corresponding homopolymers yet, unlike most of the other copolymers, those of this invention are hard, strong and useful over a range of temperatures equivalent to or superior to the plasticized, crystalline homopolymers. Because of their great utility the copolymers of the monomers of this invention with the chloroethylenes having from one to two chlorine atoms on one only of their carbon atoms, that is, vinyl and vinylidene chloride are especially preferred. Most valuable are the vinyl chloride copolymers.

The invention will now be described with reference to certain specific examples which are intended as being illustrative only.

EXAMPLE I

In this example a methoxypolyoxyethylene glycol having an average molecular weight of 750 and a hydroxyl number of 72.3 (a material said to be prepared by condensing ethylene oxide with methanol) is reacted with acrylyl chloride to form the monoacrylate ester. Into a 500 ml. three-neck flask fitted with a distillation head, an air capillary tube and a thermometer there is charged about 223 grams of the above-mentioned methoxypolyoxyalkylene glycol product. The flask is heated to 100° C. under a vacuum of about 6 mm. Hg with dry air being admitted through the capillary to strip off low boiler and dissolved air and water. About 3 grams of material are removed by this vacuum stripping operation. The distillation head is replaced by a mechanical stirrer and the air capillary by a dropping funnel. A sample removed at this point is designated (A). The flask is then cooled and 30 grams of acrylyl chloride (25 percent excess) is added thereto in a dropwise fashion from the dropping funnel, with agitation, and over a 15 minute period. The flask contents are at about 42.5° C. when the addition is commenced and during the addition the temperature gradually rises to about 49° C. The heating mantle is then removed to increase the cooling effect and hold the temperature at 49° C. or below. After an hour and forty minutes the liberation of heat subsides and heat has to be applied to hold the temperature in the range of 46 to 49° C. Heating at this temperature is continued for an additional 2½ hours. The flask and its contents are then placed in a refrigerator overnight.

In the morning the contents of the flask are observed to have solidified to a waxy solid (the material is liquid at room temperature). The air capillary and distillation head are replaced and the material is stripped at 6 to 7 mm. Hg at 65–80° C. for three hours to remove unreacted acrylyl chloride, water and air. After stripping is complete the receiver is found to contain about 5.5 grams of a material believed to be mostly acrylyl chloride.

Analysis of Sample A above, and a Sample B of the final monoacrylate ester product is as follows:

|  | Acid Number | (OH) Number | Mol. Wt. | Percent Chlorine | Percent Esterification |
|---|---|---|---|---|---|
| Sample A | 0.11 | 72.3 | C.A. 777 |  |  |
| Sample B | 5.3 |  | C.A. 810 | 3.3 | C.A. 57 |

A portion of the fresh monomeric Sample B material is co-polymerized at 50° C. in various proportions with vinyl chloride according to the recipe:

|  | Parts/wt. |
|---|---|
| Monomers to total | 100.0 |
| NaHCO$_3$ | 0.6 |
| K$_2$S$_2$O$_8$ | 0.5 |
| Water | 250.0 |

The products are obtained in every case as a fine powdery suspended or dispersed form ranging from a finely-dispersed fluid dispersion (C), to a viscous dispersion (D), and a two-phase mixture of gelatinous polymer and thin liquid phase (E). The reaction mixtures are first frozen, then methanol is added and the resulting mixtures filtered to separate the finely-divided copolymers. The filter cake is then slurried in methanol and refiltered. Three such reslurrying treatments are employed and the copolymers dried overnight under vacuum at 50° C. The data are as follows:

| Sample No. | Monoacrylate Ester, Grams | Vinyl Chloride, Grams | Time, Hours | Yield of Polymer Grams | Chlorine | *Appearance of Sheet Pressed 2'×180 °C. |
|---|---|---|---|---|---|---|
| C | .56 | 9.5 | 5¼ | 2.09 | 51.3 | Clear, rigid, well-fused. |
| D | 1.98 | 8.0 | 5½ | 2.95 | 46.8 | D.O., tough. |
| E | 6.03 | 4.0 | 5¼ | 3.42 | 34.5 | Well-fused, soft and flexible, not sticky. |
| F | 2.01 | 8.0 | 16 | 7.54 | 51.1 | Clear, well-fused, rigid, tough. |
| G | 3.98 | 6.0 | 16 | 4.69 | 44.6 | D.O. and stiff, yet flexible. |
| H | 6.03 | 4.0 | 16 | 3.68 | 25.8 | D.O. and slightly leathery and free of stickiness. |

It is apparent from the above data, and especially from the correlation of chlorine contents of the methanol-insoluble copolymers with the amounts of vinyl chloride charged, and from the appearance and behavior of the resins during the press-molding operation, that the monoacrylate ester has smoothly entered the vinyl chloride chains in substantial proportion and is efficiently plasticizing the resulting copolymer.

EXAMPLE II

For the purpose of preparing larger quantities of polymer for evaluation purposes vinyl chloride and the monoacrylate ester of the 750 molecular weight methoxypolyoxyethylene glycol (Sample B, Example I) are copolymerized in the recipe of Example I in batches containing a total of 50 parts by weight of monomers. Mixtures containing 50/50 and 60/40 of monoacrylate/vinyl chloride are employed, the polymerization being carried out in sealed bombs which are rotated in a water bath at 50° C. for 24 hours. The product in each case is obtained as a fine suspension of granular polymer in water. The polymer is separated from the polymerization liquor by adding isopropanol and decanting and the solid polymer washed four times with isopropanol by reslurrying, settling and decantation, this treatment being designed to extract unreacted monoester from the copolymer. The extracted polymer is then dried in a vacuum oven at about 50° C. Upon analysis the 50/50 copolymer is found to contain about 41.22 percent chlorine and the 60/40 copolymer about 40.91 percent chlorine. The first two isopropanol wash liquids from the 50/50 copolymer are evaporated down to yield soft materials containing, respectively, 22.46 percent and 43.63 percent chlorine and those from the 60/40 copolymer, respectively, 32.54 percent and 42.65 percent chlorine, indicating possibly that these materials could be a mixture of unreacted monomer and copolymer of low molecular weight. The extracted and dried copolymers are evaluated in detail for physical properties by determination of the second order transition temperatures ($T_1$) and flow points ($T_2$) of the raw polymer, and the tensile strength, yield point, elongation, and modulus on the milled and molded (2' x 180° C.)-copolymer. The plasticity data are as follows:

*Plasticity*

|  | $T_1$, °C. | $T_2$, °C. | [1]$\Delta T$, °C. |
|---|---|---|---|
| Copolymer A (50/50 charge ratio) | 20 | 98 | 78 |
| Copolymer B (60/40 charge ratio) | 10 | 89 | 79 |
| Vinyl chloride/2-ethylhexyl acrylate copolymer (63/37 composition) | 28 | 62 | 34 |
| Plasticized polyvinyl chloride (50 parts DOP) | 5 | 85 | 80 |

[1] $T_2 - T_1$.

The marked similarity in plasticity properties of copolymers A and B to polyvinyl chloride plasticized with 50 parts by weight of dioctyl phthalate (DOP) is readily seen. Copolymers A and B have slightly higher $T_2$ temperatures (indicative of good hot strength) than does plasticized polyvinyl chloride and second order transition temperatures just slightly higher than plasticized polyvinyl chloride but lower than a conventional "internally-plasticized" copolymer of vinyl chloride/2-ethylhexyl acrylate. The latter, however, begins to flow at very low temperatures. Thus, the $\Delta T$ values of copolymers A and B are about the same as that for externally-plasticized polyvinyl chloride and are several times that of the alkyl acrylate copolymer. In fact, due to having slightly higher $T_1$ and $T_2$ values, the high temperature properties of copolymers A and B may be slightly better than those of plasticized polyvinyl chloride.

*Stress-strain at R.T.*

|  | Tensile at Yield, lbs./sq. in. | Ultimate Tensile Strength, lbs./sq. in. | Elongation, Percent | Elastic Modulus, lbs./sq. in. |
|---|---|---|---|---|
| Copolymer A | 2,380 | 3,640 | 83 | 38,300 |
| Copolymer B | 1,990 | 3,420 | 120 | 28,500 |

It is readily apparent that, in spite of their low second order transition temperatures, copolymers A and B are exceptionally strong, tough materials. The above yield point and modulus values compare very favorably with polyvinyl chloride compositions containing 30 to 35 parts per 100 parts of resin of dioctyl phthalate plasticizer. Since these materials are not stressed beyond their yield points in service, the internally-plasticized copolymers of this example could replace plasticized polyvinyl chloride in most applications.

EXAMPLE III

In this example a monohydric methoxypolyoxyethylene glycol having an average molecular weight of about 550 is converted to the monoacrylate ester by esterification with acrylyl chloride in the presence of an insoluble, cross-linked form of a polymerized 4-vinyl pyridine as an HCl-acceptor. Into a 3-necked 1 liter flask equipped with a distillation head, an air capillary and a thermometer there is charged 247 grams (0.45 mole) of the above methoxypolyoxyethylene glycol, 135 grams of the poly 4-vinyl pyridine resin (3 times the amount equivalent to the HCl to be liberated) and 350 ml. of thiophene-free benzene. About 175 ml. of the benzene are distilled at 69–76° C. from the mixture to remove any water as an azeotrope. The flask and its contents are then cooled and a 25 ml. sample of the mix removed, from which the HCl-acceptor resin is filtered and the filtrate evaporated down (to remove benzene) and then dried. The latter sample is designated Sample A, herein. At this point about 235 grams of the monofunctional glycol-type product remain in the flask.

The air capillary is removed and a dropping funnel substituted therefor containing 49 grams of acrylyl chloride (0.54 mole or a 25 percent molar excess). The addition of acrylyl chloride in a dropwise fashion is commenced with the temperature at 39° C. No heating or cooling other than by air is applied during the one hour period required for the addition of the acrylyl chloride and the temperature rises to about 36.8° C. The mix is then stirred for an additional two hours without heating or cooling. The stirrer is then removed, the air capillary replaced and a vacuum applied to the flask to strip out unreacted acrylyl chloride. The final product is then filtered to remove the granular polyvinyl pyridine, the latter solid being washed twice with benzene and the benzene wash liquor added to the filtrate. The mixed filtrate is then distilled under the vacuum induced by a water pump to remove the benzene. A mechanical vacuum pump is then connected to the distillation head and a vacuum of about 8 mm. applied while the pot is heated to about 75° C. while bleeding in dry air through the air capillary. The weight of vacuum stripped product remaining in the pot is 252 grams having an esterification value of about 92 percent. The product is a light orangish colored, oily liquid having a slight haze. It is completely soluble in water. Copolymers of this material with vinyl chloride are prepared in proportions from 5 percent to 95 percent by weight of vinyl chloride and 5 to 95 percent by weight of the monoacrylate ester. The copolymers range from stiff and hard materials to extremely flexible materials, all of which can be processed without plasticizers and which form sheets and films of great clarity. The copolymers made from mixtures containing from 40/60 to 60/40 of the two monomers closely resemble copolymers A and B of the preceding example.

EXAMPLE IV

A methoxypolyoxyethylene glycol similar to those of the preceding examples but having an average molecular weight of about 350 is esterified with acrylic acid in this example. To a 1 liter flask fitted with a Vigreaux column and an azeotrope separator head there is charged 250 ml. of thiophene-free benzene and 250 grams (0.6 mole) of the above methoxypolyoxyethylene product. The separator head is filled with benzene and the flask contents refluxed for 2 hours. About 1 ml. of water is removed in this fashion.

The benzene in the head is then changed and 2 grams of p-toluene sulfonic acid catalyst, 1 gram of methylene blue (inhibitor) and 52 grams (0.72 mole, 10 percent molar excess) of glacial acrylic acid are added to the flask. Refluxing is then resumed with a vapor temperature of 76–78° C. At first rapid separation of the water in the separator is noted and then the rate of separation is reduced. Refluxing is continued for a total of 28¼ hours when a total of 8.8 ml. of H₂O is observed to have separated. Reflux is terminated and the flask and its contents allowed to stand overnight.

In the morning the still liquid flask contents are mixed with fuller's earth and then filtered. This procedure is again repeated. At this point the material is a pale yellow, clear liquid in amount 437 grams. This is then subjected to vacuum stripping (to remove benzene) at 90° C. and 4 mm. Hg. The vacuum stripped product weighs about 203 grams and has a light yellow color, a definite oily character and a definite odor of acrylic acid. It is completely soluble in water. Upon analysis about 70 percent of the glycol hydroxyl groups are found to have been esterified. The product spontaneously polymerizes on standing at room temperature and can be copolymerized in proportions of 5 to 95 and 95 to 5 with vinyl chloride. The spontaneously-polymerized bulk homopolymer mentioned above when put in water is converted to very highly swollen, gel-like particles.

EXAMPLE V

In this example the monoacrylate of the 750 molecular weight methoxypolyoxyethylene glycol prepared in Example I is copolymerized with other vinylidene-type monomers in mixtures containing 70 percent by weight of comonomer and 30 percent of the monoacrylate (corrected for inert material). Polymerization is carried out at 50° C. with 100 parts of total monomers being added to 250 parts of distilled water containing 0.5 part of potassium persulfate. The copolymers are obtained as suspensions which are filtered, the filter cake washed with methanol and dried. The dried copolymers are tested for their plasticity values and several are subjected to elementary analysis to determine the percentage of combined comonomer.

| Comonomer | Percent Conversion | Percent Combined Comonomer | $T_1$ | $T_2$ | $\Delta T$ | $T_1/T_2$ of Corresponding Homopolymers |
|---|---|---|---|---|---|---|
| Acrylonitrile | 81 | 84.4 | 85 | 250 | 165 | 100–120/280 |
| Styrene | 11 | | 69.5 | 97 | 27.5 | 95/130 |
| Vinylidene chloride | 41 | 87.5 | 57 | 172 | 115 | 67/172 |

The above data are somewhat surprising in that the $T_2$ temperature (which may be the "crystalline" melting point) of the acrylonitrile and vinylidene chloride copolymers are not materially different from those of, respectively, polyacrylonitrile or polyvinylidene chloride, this in spite of about 12 to 16 percent combined acrylate comonomer. The second order transition temperatures of these materials are somewhat lower indicating perhaps a slightly greater flexibility at lower temperatures than the corresponding homopolymer. The lowering of both $T_1$ and $T_2$ of polystyrene by the polyether acrylate comonomer reflects the fact that there is little polar interaction in this polymer to maintain a high $T_2$ when flexibilizing groups are introduced.

EXAMPLE VI

In this example the 550 molecular weight glycol-type material of the Example III is reacted with maleic anhydride. About 200 grams of the monohydric glycol and 35–6 grams of maleic anhydride (1:1 mole ratio) are charged to a glass reaction flask. The flask and its contents are gently heated at 50° C. for about three hours. A sample of the mixture is then removed and titrated to reveal only about 5 percent of the anhydride groups have been opened. At this point three drops of concentrated sulfuric acid are added and the flask allowed to stand overnight at room temperature after which the reaction is found to be only 12 percent complete. The flask is then heated for two hours at 70° C. to reach 27 percent conversion. After several additional hours at 75° C. a titrated sample reveals that about 60 percent of the anhydride groups have reacted to form a monoester. The latter crude product is copolymerized with vinyl chloride in 50:50 and 75:25 ratios (VCl: maleate). The products obtained after methanol work up are definitely soft and more flexible than polyvinyl chloride.

EXAMPLE VII

The monoacrylate ester of the methoxypolyoxyethylene glycol of Example I (750 molecular weight) is copolymerized with vinylidene cyanide. About 3.90 grams of the monoacrylate glycol ester (52 percent of total), 3.60 grams (4.13 ml.) of the vinylidene cyanide (48 percent of total monomers), 0.075 gram of 2,4-dichlorobenzoyl peroxide, and 40 ml. of benzene are sealed into a tube under dry nitrogen. The tubes are then warmed to 50° C. Reaction is noted in only 30 seconds. After about 20 hours at 50° C. about 1.09 grams of granular polymer are isolated from the reaction vessel. The isolated polymer softens at about 157 to 160° F. and is quite sensitive to the effects of alkali.

EXAMPLE VIII

In this example the monoacrylate ester of a chloropolyoxytetramethylene glycol is synthesized and utilized as a co-monomer in copolymerization with vinyl chloride. The monomeric ester is prepared by reacting one mole of tetrahydrofurane with one mole of aluminum trichloride to form the oxonium salt and then reacting the oxonium salt with acrylyl chloride. The reaction is carried out by cooling an exess of commercial grade tetrahydrofurane to −30° C. and then adding the aluminum trichloride. The mix warms up and it is again cooled to −30° C. before adding the acrylyl chloride. The latter addition is added from a dropping funnel over a 2 minute period. The mixture is agitated for another half hour in the cold (Dry Ice/acetone) and then stored overnight in a low temperature (−30° C.) refrigerator.

Next day the reaction vessel and its contents are brought out and allowed to warm up for 2 hours after which the temperature of the mix is 26° C. Then the reaction vessel is warmed to 35° C. in a water bath for 15 minutes before it is again cooled to −30° C. in Dry Ice/acetone. At this point the mixture becomes a mushy solid. The mushy solid is allowed to warm up to 26° C. before it is poured into a mixture of ice and 10% volume sulfuric acid. The reaction product is taken up in ether and the ether extract washed once with water, twice with 1 N-NaOH, and then with water again. At this point the ether solution is clear and colorless. The ether is then evaporated in vacuo, the ether removal being completed by warming the residue to 50° C. under 0.2 mm. Hg for one hour. There is thus obtained 238 grams, a yield of 62%, of a colorless oil which crystallizes in a few minutes in a refrigerator.

The product analyzes as having an acid number of 7.62 (0.14 meq. base/gram of sample), a chlorine content of 2.62%, 0.737 millimoles of acrylic ester per gram, an average saponification number of 61 (uncorrected) and 39.3 (corrected), and an average molecular weight of 1360 (calculated). Such a material is believed to contain an average of at least 18 tetramethylene oxide groups per molecule.

The above ester is utilized as a co-monomer with vinyl chloride according to the following recipe:

| | Parts/wt. |
|---|---|
| Monoacrylate ester of chloropolyoxytetramethylene glycol | 20 |
| Vinyl chloride | 80 |
| Water | 250 |
| NaHCO$_3$ | 0.6 |
| Nekal AEMA [1] | 0.6 |
| Cuprylyl peroxide | 0.5 |

[1] A commercial emulsifier said to be a mixture of isobutyl naphthalene sodium sulfonate and gelatin.

The reaction is carried out in a plurality of sealed, evacuated glass tubes, each of which is prepared by (1) adding the monoacrylate ester (2.0 grams actual wt.), (2) cooling the tube in ice water, (3) adding 25 ml. of an aqueous phase made up of the water-soluble ingredients, (4) then adding the caprylyl peroxide (12 microdrops), (5) the tube contents frozen solid, (6) the tube neck shrunken down and (7) finally 8.0 grams of vinyl chloride added by vacuum charging. The tubes are placed in racks rotating end-over-end in a 50° C. water bath for three hours.

The tubes are then removed, broken open and the product, which is a granular slurry, is washed 3 times in pure methanol. Finally, the third methanol slurry is filtered and the filter cake dried in a vacuum oven at 50° C. The yield is 72.5 grams of dry polymer, an average of 4.25 grams per tube.

The dry product is milled on a two-roll plastic mill with 1 part per 100 parts of polymer of dibutyl tin dilaurate as a stabilizer. The polymer forms a sheet on the mill with a mill roll temperature of about 300° F. The milled material is subjected to plasticity tests such as those shown in Example II. The data, along with corresponding values for several standard controls, are as follows:

| Composition | T$_1$, ° C. | T$_2$, ° C. | T, ° C. |
|---|---|---|---|
| (1) VYHH Control [1] | 74.5 | 102 | 27.5 |
| (2) Plasticized polyvinyl chloride (50 parts DOP) | .5 | 85 | 80.0 |
| (3) Copolymer of Example VIII | −11 | 87 | 98.0 |

[1] A commercial vinyl chloride/vinyl acetate copolymer containing sufficient vinyl acetate as to be capable of being processed without added plasticizer.

Samples of the blended, stabilized product described above are molded for 2 minutes at 335° F. in a flash type mold. The physical properties of the molded specimens at room temperature and 75° C. are then determined. The data, each value representing an average of at least 3 samples, are as follows:

| Molding Cycle | Yield Point, lbs./sq. in. | Tensile, lbs./sq. in. | Elongation, Percent | 100% Modulus, lbs./sq. in. |
|---|---|---|---|---|
| Room Temperature | 570 | 2,440 | 240 | 5,670 |
| At 75° C | | 830 | 340 | 355 |

The stress-strain values show plainly that the ΔT values are real since the uncompounded stock has good strength values at room temperature and appreciable strength at 75° C. Copolymers of 20% or more of other monomers such as vinyl acetate, octyl acrylate or vinyl stearate do not have measurable properties at the latter temperature. The above properties, together with a Gehman Freeze point of −15° C., make the copolymer of Example VIII useful over a wide range of temperatures in applications requiring strength and flexibility.

The stability of the dibutyl tin dilaurate stabilized copolymer of Example VIII is tested by oven aging at 175° C. The copolymer of Example VIII is much superior to a copolymer of vinyl chloride and vinyl epoxy stearate (a polymer having a built-in stabilizing epoxy group) of equivalent hardness. The data indicates that the copolymer of Example VIII can be stabilized so as to be equivalent or superior to other commercially-available vinyl chloride polymers and almost equivalent to plasticized polyvinyl chloride.

EXAMPLE IX

In a repeat series of experiments, in which the proportions of the monoacrylate of chloro-polyoxytetramethylene glycol (that of Example VIII) charged vary between 5 and 40% by weight and the reactions are terminated at about 15 to about 60% conversion, the following results are obtained:

| Sample No. | $T_1$ | $T_2$ | $\Delta T$ |
|---|---|---|---|
| A. 5% Monoacrylate charged, 14% conversion, 29% acrylate by analysis | 12 | 97 | 85 |
| B. 10% Monoacrylate charged, 26% conversion, 32% acrylate by analysis | −3 | 75 | 78 |
| C. 40% Monoacrylate charged, 61% conversion, 59.5% acrylate by analysis | −34 | 48 | 82 |

These data indicate that around 25–35% combined monoacrylate ester is about optimum for a good balance between low temperature and high temperature properties. For best low temperature properties it would appear that between about 30% and about 50% of the ester would be required.

EXAMPLE X

In this example, 407 grams of tetrahydrofurane are cooled to −60° C. and 89.9 grams of $AlCl_3$ are added over an interval of 1 minute. The temperature of the mix rises to 0° C. and it is allowed to cool down to −55° C. before 61 grams of acrylyl chloride are added over an interval of one minute. Over the first 36 minutes the heat of reaction causes the temperature of the mixture to rise to −6° C. At this point the reaction vessel and its contents are placed in a low temperature refrigerator overnight. The next day the vessel is taken out of the refrigerator and its contents allowed to warm up to about 25° C. over a 1.75 hour period.

The mix is then poured over a mixture of ice and 10 volume percent of 20% $H_2SO_4$ added thereto. Then sufficient ether is added to take up the organic phase. The ether extract is separated and washed once with 10 volume percent $H_2SO_4$, once with 1 N-NaOH and then with NaCl-saturated water. The ether is then evaporated in vacuo finishing in a water bath at 50–55° C. at 0.2 mm. Hg. The product, an almost colorless oil, weighs 184 grams or a yield of 45%. The molecular weight of this product is calculated to be about 1740.

The above product is copolymerized with vinyl chloride according to the procedure of Example VIII. Various proportions of the above monoacrylate ester are charged and the reactions are terminated at various stages to follow the course of the reaction. The data are as follows:

| Sample No. | $T_1$, ° C. | $T_2$, ° C. | $\Delta T$, ° C. |
|---|---|---|---|
| A. 10% Monoacrylate charged, 21% Conversion, 28% Monoacrylate by analysis | 19 | 102 | 83 |
| B. 20% Monoacrylate charged, 40% Conversion, 50% Monoacrylate by analysis | −19 | 81 | 100 |
| C. 20% Monoacrylate charged, 96% Conversion, 22% Monoacrylate by analysis | 52 | 134 | 82 |

As the proportion of the monoacrylate of polyoxytetramethylene glycol combined in the copolymer is increased in the range between 30 and about 50% the $T_1$ temperature drops off very rapidly, much more rapidly than the $T_2$ value, with the result that the $\Delta T$ values, or useful temperature range, grow larger. Above 50% monoacrylate (see Example IV, Sample C) the reduction in $T_1$ grows smaller and the $T_2$ temperature drops at about a constant rate with the result that the $\Delta T$ value is again about 75 to 85 degrees. Above about 60% combined ester the copolymer becomes too low in softening point ($T_2$) to be of wide utility, as a general-purpose resin.

EXAMPLE XI

In this experiment a monoacrylate ester of a chloropolyoxytetramethylene glycol of considerably lower molecular weight is prepared by a modified procedure wherein 200 grams of commercial tetra-hydrofurane (THF) containing 1 gram of methylene blue as a stabilizer is cooled to −60° C. and 225 grams of $AlCl_3$ are added very slowly to prevent rise in the temperature. After the salt is all in the temperature of the mix is allowed to come up to room temperature. At this point the THF-$AlCl_3$ oxonium salt is only partly soluble. 50 grams of THF are added and the salt almost completely dissolves. The mixture is then transferred to a dropping funnel while excluding moisture. The salt solution is then added dropwise to 30.2 grams of acrylyl chloride dissolved in 50 ml. of THF, the latter solution being in a 500 ml. 3-necked flask fitted with a thermometer, stirrer and a $CaCl_2$ drier-equipped vent tube. The acrylyl chloride solution is maintained at 25 to 30° C. throughout the period of addition of the salt solution.

The resulting product is run into ice-$H_2SO_4$ and the organic phase is taken up in ether, washed and the ether removed as before except that the final vacuum stripping operation is performed with dried air introduced through an air capillary at a pressure of 0.2 mm. Hg for 1.5 hours. The product, weighing 154 grams, is a dark, amber-colored oil. Its cryoscopic molecular weight is 580 (calculated 600–635) which calculates as an average ($n$) of about 7 (tetramethylene oxide units per molecule).

The above low molecular weight monoacrylate ester of the chloropolyoxytetramethylene glycol is copolymerized with vinyl chloride. The polymerization is carried out as in Examples VIII to X in aqueous emulsion with 20, 30 and 40% of the monoacrylate in the charge. The data are as follows:

| Sample No. | Percent Monoacrylate Charged | Percent Monoacrylate In Copolymer | Percent Conversion | $T_1$, ° C. | $T_2$, ° C. | $\Delta T$, ° C. |
|---|---|---|---|---|---|---|
| A | 20 | 47 | 35 | −12 | 77 | 89 |
| B | 30 | 29.5 | 90 | 16 | 104 | 88 |
| C | 40 | 38 | 89 | −14 | 85 | 99 |

It is interesting to note that the above data indicates that the monoacrylate comonomer is about as effective (weight-for-weight) in its effect on copolymer flexibility as is a conventional plasticizer for polyvinyl chloride. As compared to ester-plasticized polyvinyl chloride, the above copolymers are slightly harder, slightly tougher and (A and C) slightly more flexible at low temperatures.

EXAMPLE XII

During the preparation of a monoacrylate ester of chloropolyoxytetramethylene glycol the washed ether solution of product developed copious crystals leaving considerable liquid, light-colored oil. The liquid fraction is decanted away from the crystals, mixed with decolorizing carbon, filtered and the ether evaporated in the usual fashion. The product is a light-colored oil (Fraction A). The crystals remaining are suspended in ether, mixed with decolorizing carbon and granular $Na_2SO_4$, filtered through fuller's earth and the ether evaporated leaving a light colored oil (Fraction B) which appears to be slightly more viscous than the other fraction. When these two fractions are analyzed the liquid fraction is found to have a cryoscopic molecular weight of 712 (value based on end-group analysis 840) whereas the crystal-derived oil has a cryoscopic molecular weight of 1495 and an analytical molecular weight of 2500. Fraction B is the highest molecular weight tetramethylene glycol derivative described herein. Fractions A and B are each copolymerized with vinyl chloride in proportions of from 10 to 40% of the monoacrylate. The recipe and work-up procedure utilized is that of Example VIII. The polymers are evaluated for $T_1$, $T_2$ and $\Delta T$ values which are summarized below.

FRACTION A

| Sample No. | Percent Monomers Charged | | Percent Monoacrylate By Analysis | Percent Conversion | $T_1$, °C. | $T_2$, °C. | $\Delta T$, °C. |
|---|---|---|---|---|---|---|---|
| | Percent VCl | Monoacrylate | | | | | |
| (1) | 100 | | | 19.1 (3 hrs)* | 92 | 142 | 50 |
| (2) | 90 | 10 | 25.6 | 34.1 (3 hrs) | 36 | 106 | 70 |
| (3) | 80 | 20 | 45.0 | 35.2 (3 hrs) | −14 | 76 | 90 |
| (4) | 70 | 30 | 63.7 | 35.8 (3 hrs) | −37 | 27 | 64 |
| (5) | 60 | 40 | 73.2 | 50.7 (3 hrs) | −47 | 7 | 54 |
| (6) | 100 | | | 89.1 (16 hrs)** | 89 | 145 | 56 |
| (7) | 90 | 10 | 13.8 | 96.0 (16 hrs) | 63 | 133 | 70 |
| (8) | 80 | 20 | 23.5 | 93.8 (16 hrs) | 45 | 121 | 76 |
| (9) | 70 | 30 | 32.0 | 89.7 (16 hrs) | 12 | 106 | 94 |
| (10) | 60 | 40 | 42.7 | 81.2 (16 hrs) | −22 | 56 | 78 |

FRACTION B

| Sample No. | Percent Monomers Charged | | Percent Monoacrylate By Analysis | Percent Conversion | $T_1$, °C. | $T_2$, °C. | $\Delta T$, °C. |
|---|---|---|---|---|---|---|---|
| | Percent VCl | Monoacrylate | | | | | |
| (11) | 100 | | | 20.2 (3 hrs)* | 91 | 142 | 51 |
| (12) | 90 | 10 | 22.5 | 37.5 (3 hrs) | 51 | 112 | 61 |
| (13) | 80 | 20 | 39.7 | 39.9 (3 hrs) | −14 | 91 | 105 |
| (14) | 70 | 30 | 43.6 | 56.7 (3 hrs) | −23 | 85 | 108 |
| (15) | 60 | 40 | 56.8 | 52.4 (3 hrs) | −36 | 61 | 97 |
| (16) | 100 | | | 94.7 (16 hrs)** | 92 | 142 | 54 |
| (17) | 90 | 10 | 13.2 | 96.8 (16 hrs) | 71 | 138 | 67 |
| (18) | 70 | 30 | 30.0 | 87.8 (16 hrs) | −10 | 94 | 104 |
| (19) | 60 | 40 | 41.7 | 90.5 (16 hrs) | −23 | 84 | 107 |

*Conversion after a three hour reaction.
**Conversion after a sixteen hour reaction.

EXAMPLE XIII

In this example, a monoacrylate ester of a chloropolyoxytetramethylene glycol is employed in the production of an 80 vinyl chloride/20 monoacrylate copolymer. The monoacrylate ester is prepared by a procedure similar to that of Examples VIII to XII and has an end-group molecular weight of about 2140. The polymerization is conducted employing the recipe of Example VIII for 3 hours at 50° C. to a total conversion of about 22%. The product is treated once with methanol and the solid polymer then separated and extracted three times with methyl ethyl ketone. About 48% by weight of the copolymer is soluble in the latter solvent. Both the soluble and insoluble copolymer fractions are analyzed for chlorine content and for $T_1$, $T_2$ and $\Delta T$ values. The data are as follows:

| Soluble Polymer | | | | | Insoluble Polymer | | | | |
|---|---|---|---|---|---|---|---|---|---|
| Percent VCl | Percent Monoacrylate Combined | $T_1$, °C. | $T_2$, °C. | $\Delta T$, °C. | Percent VCl | Percent Monoacrylate Combined | $T_1$, °C. | $T_2$, °C. | $\Delta T$, °C. |
| 66 | 34 | 10 | 98 | 88 | 58 | 42 | −9 | 87 | 96 |

From these data it is clear that the excellent $\Delta T$ values of the vinyl chloride copolymers of this invention is not due to cross-linking since the $\Delta T$ value of the above completely soluble copolymer fraction is not appreciably different from that of the insoluble fraction.

The present application is a continuation-in-part of co-pending application Serial No. 557,859, filed January 9, 1956, now abandoned.

I claim:
1. A resinous thermoplastic copolymer of (1) from 1 to 95% by weight of a monomer selected from the group consisting of vinyl chloride, vinylidene chloride, acrylonitrile and vinylidene cyanide and (2) from 5 to 99% by weight of a monomer having the structure

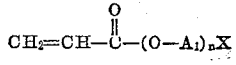

wherein $A_1$ represents a divalent alkylene group having at least 3 consecutively connected carbon atoms, $n$ is a number equal to at least 4 and X is a halogen.

2. A resinous thermoplastic copolymer of (1) from 1 to 95% by weight of vinyl chloride and (2) from 5 to 99% weight of a monomer having the structure $$CH_2=CH-\overset{O}{\overset{\|}{C}}-(O-A_1)_nX$$

wherein $A_1$ represents a divalent alkylene group having at least 3 consecutively connected carbon atoms, $n$ is a number equal to at least 4 and X is a halogen.

3. A resinous thermoplastic copolymer of (1) from 1 to 95% by weight of vinyl chloride and (2) from 5 to 99% weight of a monomer having the structure $$CH_2=CH-\overset{O}{\overset{\|}{C}}-(O-A_1)_nX$$

wherein $A_1$ represents a tetramethylene group, $n$ is a number equal to at least 4 and X is chlorine.

4. A resinous thermoplastic copolymer of (1) from 1 to 95% by weight of vinyl chloride and (2) from 5 to 99% by weight of a monomer having the structure

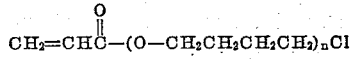

wherein $n$ is a number of at least 4.

References Cited in the file of this patent
UNITED STATES PATENTS

| 2,129,694 | Izard | Sept. 13, 1938 |
| 2,129,722 | Woodhouse | Sept. 13, 1938 |

(Other references on following page)

UNITED STATES PATENTS

| | | |
|---|---|---|
| 2,397,602 | Gresham | Apr. 2, 1946 |
| 2,458,888 | Rehberg et al. | Jan. 11, 1949 |
| 2,516,064 | Marks | July 18, 1950 |
| 2,692,256 | Bauer et al. | Oct. 19, 1954 |
| 2,815,369 | Holt | Aug. 26, 1955 |
| 2,839,430 | Rimmer | June 17, 1958 |
| 2,892,819 | Stewart et al. | June 30, 1959 |
| 2,938,887 | Weiss | May 31, 1960 |

FOREIGN PATENTS

| | | |
|---|---|---|
| 159,360 | Australia | Oct. 18, 1954 |

OTHER REFERENCES

"Synthetic Organic Chemicals," 13th edition, page 56, Carbide & Carbon Chemicals Co., New York City.

UNITED STATES PATENT OFFICE
CERTIFICATE OF CORRECTION

Patent No. 3,004,958            October 17, 1961

Alan Robert Berens

It is hereby certified that error appears in the above numbered patent requiring correction and that the said Letters Patent should read as corrected below.

Column 3, lines 3 to 5, the formula should appear as shown below instead of as in the patent:

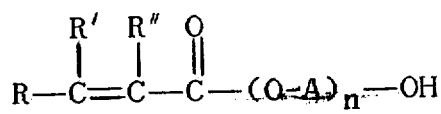

column 4, line 50, for "having considerable flexibility and reduced tendency towar" read -- chloride polymeric backbone can also be envisioned as --; column 6, line 16, for "ene)," read -- ene). --; column 9, line 29, for "39° C." read -- 29° C. --; columns 15 and 16, in the table for "FRACTION A", column 5, line 6 thereof, for "89 1" read -- 89.1 --; same table, column 4, line 9 thereof, for "32 0" read -- 32.0 --; same columns 15 and 16, in the table for "FRACTION B", column 5, line 2 thereof, for "37 5" read -- 37.5 --; column 16, line 37, after "99%" insert -- by --.

Signed and sealed this 6th day of November 1962.

(SEAL)
Attest:
ERNEST W. SWIDER
Attesting Officer

DAVID L. LADD
Commissioner of Patents